(12) United States Patent
Hart et al.

(10) Patent No.: US 9,495,269 B1
(45) Date of Patent: Nov. 15, 2016

(54) MOBILITY VALIDATION BY TRIAL BOOT USING SNAP SHOT

(71) Applicant: International Business Machines Corporation, Armonk, NY (US)

(72) Inventors: Brian W. Hart, Austin, TX (US); Anil Kalavakolanu, Austin, TX (US); Bruce G. Mealey, Austin, TX (US); James A. Pafumi, Leander, TX (US); Vani D. Ramagiri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/971,201

(22) Filed: Dec. 16, 2015

(51) Int. Cl.
G06F 11/00 (2006.01)
G06F 11/263 (2006.01)
G06F 3/06 (2006.01)
G06F 9/455 (2006.01)

(52) U.S. Cl.
CPC ............. *G06F 11/263* (2013.01); *G06F 3/065* (2013.01); *G06F 3/067* (2013.01); *G06F 3/0619* (2013.01); *G06F 3/0647* (2013.01); *G06F 3/0664* (2013.01); *G06F 9/45558* (2013.01); *G06F 2009/45591* (2013.01)

(58) Field of Classification Search
CPC .................................................. G06F 11/263
See application file for complete search history.

(56) References Cited

U.S. PATENT DOCUMENTS

| | | | |
|---|---|---|---|
| 8,091,084 B1 | 1/2012 | Dobrovolskiy et al. | |
| 8,826,074 B2* | 9/2014 | Bauer | G06F 11/2242 714/25 |
| 9,069,607 B1* | 6/2015 | Gopalakrishna Alevoor | G06F 9/45558 |
| 9,092,837 B2* | 7/2015 | Bala | G06F 11/1402 |
| 9,098,214 B1* | 8/2015 | Vincent | G06F 9/4856 |
| 9,098,364 B2* | 8/2015 | Davis | G06F 8/60 |
| 2008/0104608 A1* | 5/2008 | Hyser | G06F 9/5027 718/105 |
| 2010/0042993 A1 | 2/2010 | Vasilevsky et al. | |
| 2011/0314345 A1* | 12/2011 | Stern | G06F 11/3466 714/47.1 |
| 2013/0297769 A1 | 11/2013 | Chang et al. | |
| 2014/0115175 A1* | 4/2014 | Lublin | G06F 9/4856 709/228 |
| 2014/0146055 A1* | 5/2014 | Bala | G06F 11/1402 345/501 |
| 2015/0339156 A1* | 11/2015 | Vincent | G06F 9/4856 718/1 |
| 2015/0381723 A1* | 12/2015 | Sancheti | G06F 3/065 709/217 |

FOREIGN PATENT DOCUMENTS

EP 2043320 12/2009

* cited by examiner

*Primary Examiner* — Christopher McCarthy
(74) *Attorney, Agent, or Firm* — VanLeeuwen & VanLeeuwen; Steven L. Bennett

(57) ABSTRACT

An approach is provided for migrating a live instance of a virtual machine from a source computer system to a target computer system. The approach operates by creating a consistent snap shot image of an operating system environment that is running the live instance of the virtual machine on the source computer system. A test virtual machine container is created based on an actual virtual machine container that corresponds to the live instance of the virtual machine. Based on the snap shot image of the operating system environment, a test virtual machine is created in the test virtual machine container. The generated test virtual machine is tested with a migration of the live instance of the virtual machine being performed in response to a successful test of the test virtual machine. The migration is aborted in response to an unsuccessful test of the test virtual machine.

20 Claims, 4 Drawing Sheets

MOBILITY VALIDATION BY TRIAL BOOT USING SNAP SHOT

BACKGROUND OF THE INVENTION

Technical Field

This disclosure relates to migration of virtual machine logical partitions between systems. More particularly, this disclosure relates to validating the migration to the other system before actual migration of the logical partition.

Description of Related Art

In some data processing environments, an application and/or workload may be migrated from one computing environment to another computing environment. For example, system virtualization is a technology which can divide a single host (e.g., computer, server, etc.), into multiple parts, or partitions, each running a separate instance, or image, of an operating system. The instances of the operating systems or partitions are separate, or isolated, from each other in some ways. For example, the partitions have separate file systems, separate users, separate applications, and separate processes. However, the partitions may also share some resources of the host. For example, the partitions can share the memory, the kernel, the processors, the hard drives, and/or other software, firmware, and/or hardware of the host. Thus, each partition or instance of the operating system can look and feel like a separate server or machine from the perspective of its users. These instances are commonly referred to as "virtual" or "virtualized" machines, and each partition may be referred to as a logical partition (LPAR).

One server or data processing system can generally host a number of LPARs. These LPARs may also be transferred or migrated from one server or system to another. For example, to facilitate hardware updates or other types of maintenance services, an LPAR may be migrated from one server to another without disrupting the running of an operating system and hosted applications of the migrating LPAR, thereby maintaining service operability without disruption.

SUMMARY

An approach is provided for migrating a live instance of a virtual machine from a source computer system to a target computer system. The approach operates by creating a consistent snap shot image of an operating system environment that is running the live instance of the virtual machine on the source computer system. A test virtual machine container is created based on an actual virtual machine container that corresponds to the live instance of the virtual machine. Based on the snap shot image of the operating system environment, a test virtual machine is created in the test virtual machine container. The generated test virtual machine is tested with a migration of the live instance of the virtual machine being performed in response to a successful test of the test virtual machine. On the other hand, the migration is aborted in response to an unsuccessful test of the test virtual machine.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1A:
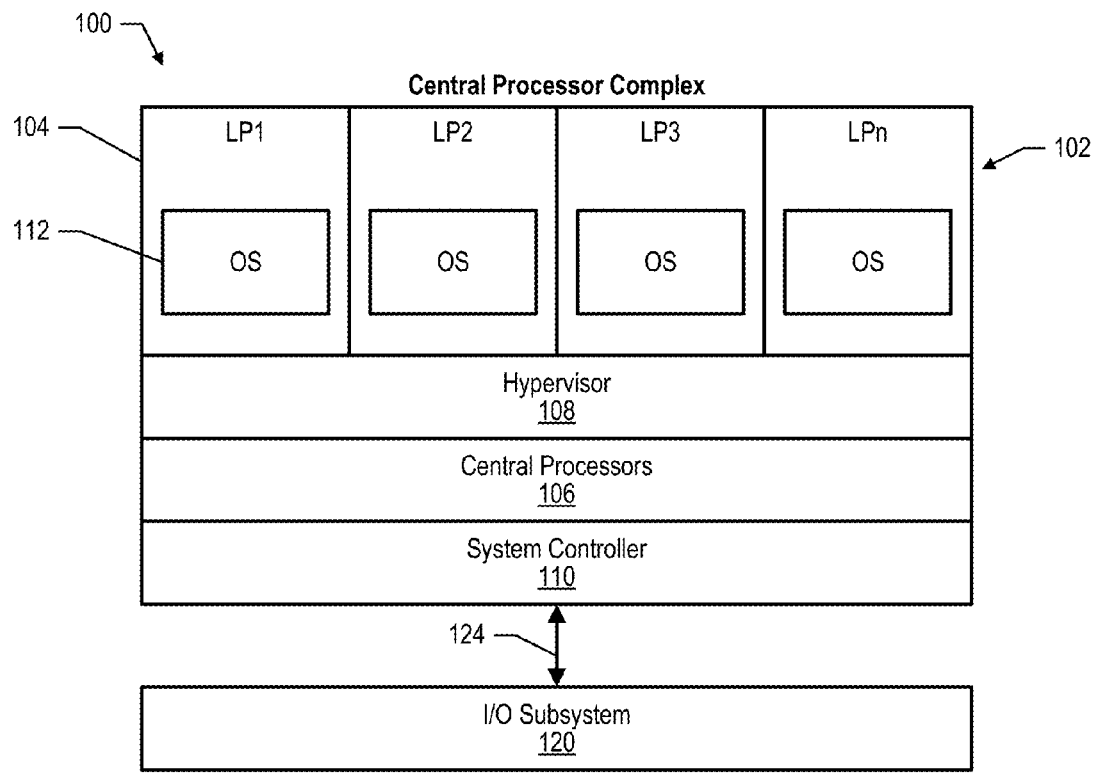
FIG. 1A depicts one embodiment of a computing environment to incorporate and use one or more aspects of the present invention.

FIGS. 1-4 show an approach to ensure that a future virtual machine (VM) migration would succeed by first performing a trial run of the migration using a snap shot image of OS booted in a copy-on-write environment. In one embodiment, the approach performs the following basic steps:
1. Create a consistent snap shot of the OS instance to be migrated;
2. Create a VM container on the source system that matches the target VM container (CPU, memory, virtual adapters; all may change during the migration);
3. Boot the snap shot image using copy on write in the new container;
4. If the boot succeeds, create the VM container for the migration for the target;
5. Perform a trial migration using the copy on write instance of the VM from new source container to target container;
6. Discard the trial migration snapshot image and new source container, but retain the target container; and
7. If trial migration succeeded then migrate the Live VM instance from source to target.

The trial migration can be performed when a logical partition (LPAR) is scheduled to be migrated to another system. In one embodiment, the trial migration is performed before a request to migrate is processed. In another embodiment, the trial migration is performed in response to operating system changes in the VM.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIGS. 1A and 1B that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
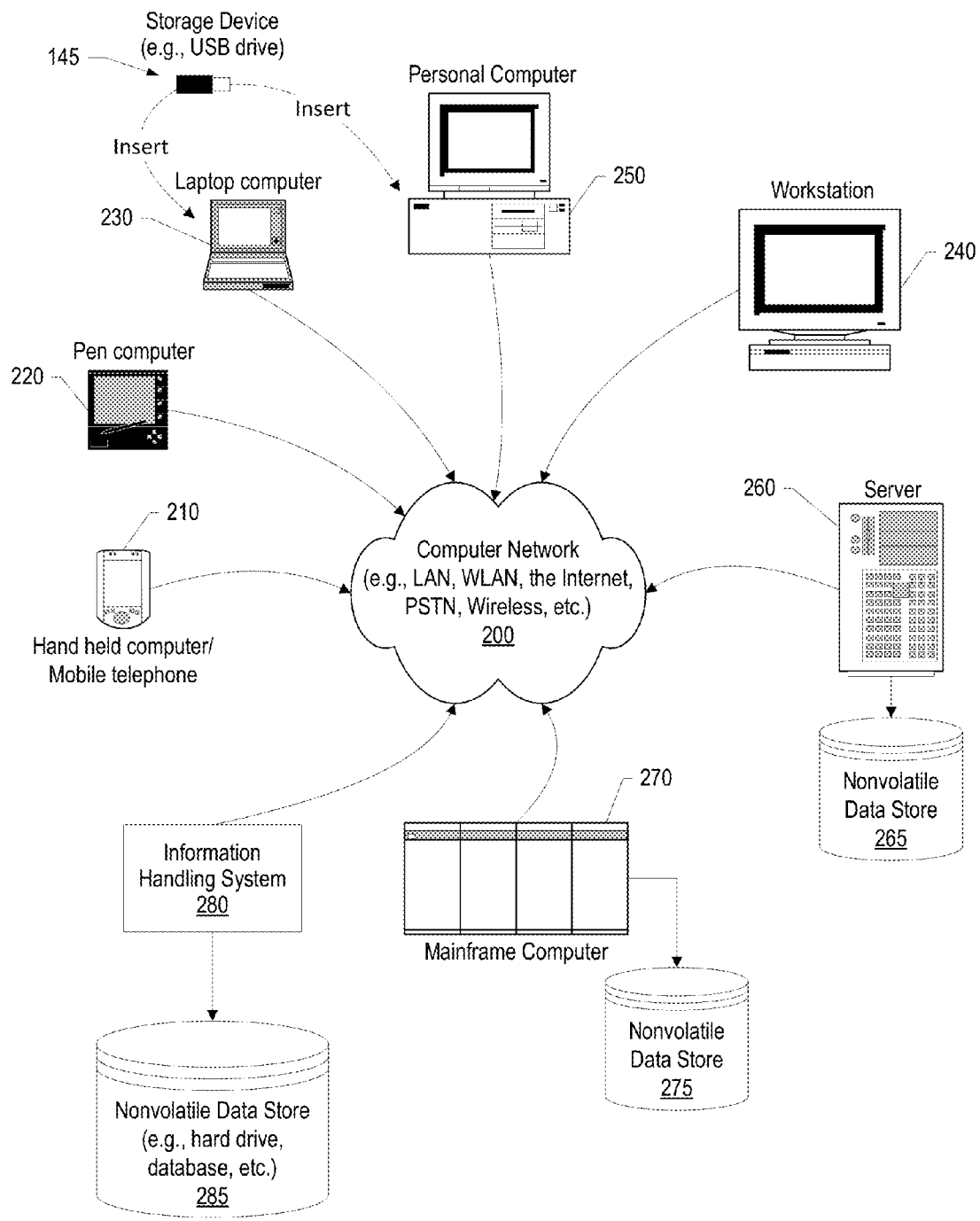
FIG. 2 is a network environment that includes various types of information handling systems interconnected via a computer network.

FIG. 1A depicts one embodiment of a computing environment to incorporate and use one or more aspects of the present invention. As one example, computing environment 100 includes a central processor complex (CPC) 102 coupled to an input/output (I/O) subsystem 120. Central processor complex 102 includes, for instance, one or more partitions 104 (e.g., logical partitions LP1-LPn), one or more central processors 106, a hypervisor 108 (e.g., a logical partition manager), and a system controller 110, each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time-sliced manner.

As used herein, firmware includes, e.g., the microcode, millicode, and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In this particular example, each logical partition has a resident operating system 112, which may differ for one or more logical partitions. In one embodiment, operating system 112 is the AIX® operating system developed by International Business Machines Corporation, Armonk, N.Y. Further, in this example, each logical partition has assigned thereto a portion of system main storage (memory).

A logical partition 104 includes one or more logical processors. Each logical processor may have a central processor 106 permanently allocated thereto, or there may be a pool of central processors 106 available for dynamic allocation to any group of logical processors, possibly spanning multiple logical partitions 104.

Logical partitions 104 are managed by hypervisor 108 implemented, for instance, by firmware running on processors 106. Logical partitions 104 and hypervisor 108 each comprise one or more programs residing in respective portions of main storage associated with the central processor. One example of hypervisor 108 is the PowerVM™, offered by International Business Machines Corporation, Armonk, N.Y.

Central processors 106 are coupled to, but separate from, system controller 110. System controller 110 is, for instance, a hardware component that controls access to memory and caches within the central processors, and communicates between the central processors and input/output subsystem 120. The system controller is responsible for the queuing, serialization, and execution of requests made by the central processors and the I/O subsystem. In one example, it is responsible for sending commands to particular central processors and/or broadcasting commands to multiple central processors. The system controller may be a centralized component or its functions may be distributed. The system controller is not a processor or core; for example, it does not execute user applications. Instead, it is the communications mechanism between the I/O subsystem and the central processors.

Further details regarding central processors 106 are described with reference to FIG. 1B. In one example, a central processor 106 includes one or more cores or processors 150, which are the physical processors that are allocated to one or more logical partitions. A central processor is considered part of a node, and each node includes one or more central processors. A logical partition can span nodes in which one or more central processors from one node and one or more central processors from another node can be assigned to the logical partition.

Further, in accordance with an aspect of the present invention, central processor 106 includes a controller 160 (e.g., hardware controller) used to perform re-characterization to adjust the parameters of a processor, which may be inactive or active. An inactive processor is a processor that is not currently accepting workload to be executed. It may be a processor which was performing at an unacceptable level, and therefore, its workload was moved to another processor, but it is still powered up; or it may be a spare processor waiting to be activated. An active processor is a processor that is ready to receive and execute workload and/or is executing workload.

Figure 1B:
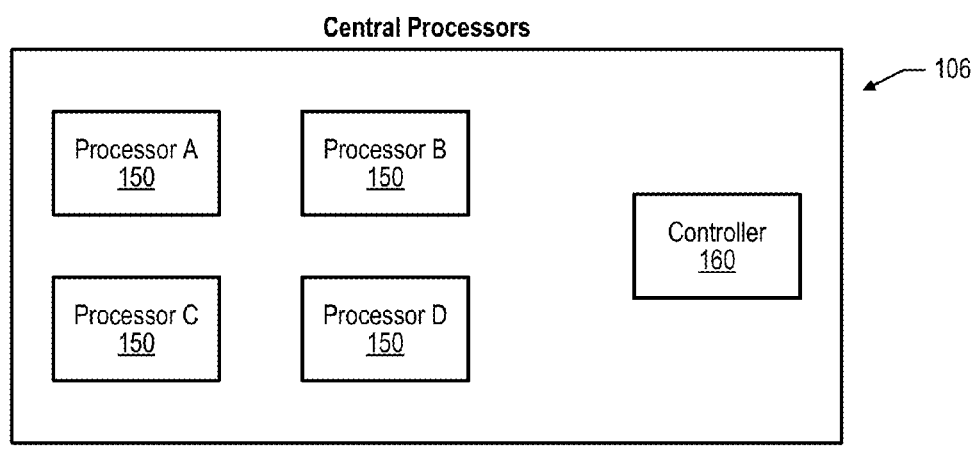
FIG. 1B depicts further details of the central processors of FIG. 1A, in accordance with an aspect of the present invention.

While FIGS. 1A and 1B shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIGS. 1A and 1B to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
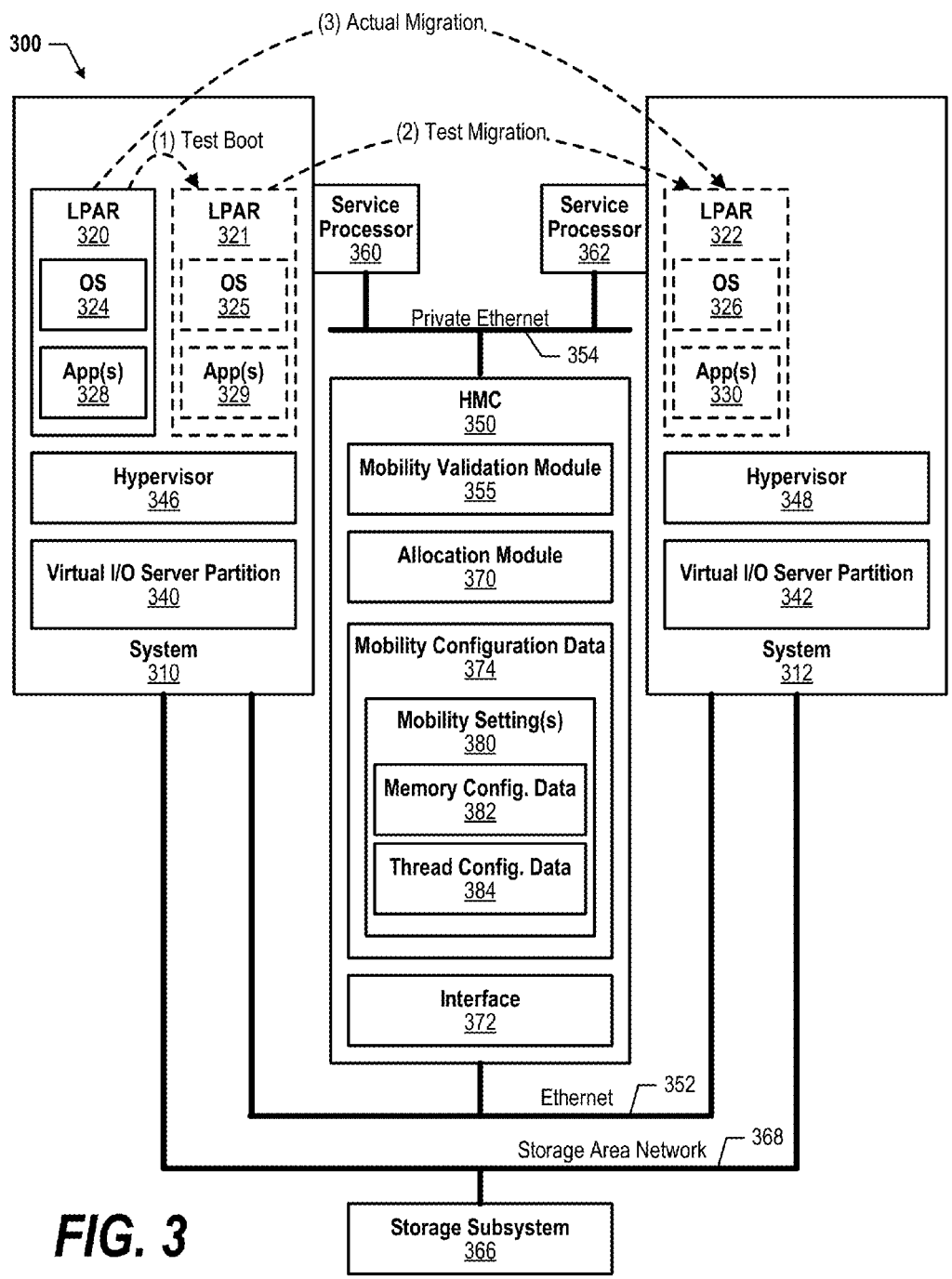
FIG. 3 is a diagram depicting an embodiment of a data processing environment with logical partitions migrated from one system to another system.

FIG. 3 is a diagram depicting an embodiment of a data processing environment with logical partitions migrated from one system to another system. FIG. 3 is an illustrative embodiment of a system 300 for mobility operation resource allocation. System 300 may be implemented on data processing systems or platforms such as, but not limited to, servers 240 and/or 260, clients 210 and/or 220, or at other data processing system locations. In the embodiment illustrated in FIG. 3, system 300 includes a server system 310 and a server system 312. Processors, memory, and other hardware resources of computer system server systems 310 and 312 may be apportioned into logical partitions (LPARs) that may operate independently, each LPAR running its own operating system and applications. In the illustrated embodiment, server system 310 currently includes LPAR 320. For one or more of a variety of reasons, LPAR 320 is being migrated from system 310 to system 312. The approach described herein, validates the migration before actually migrating the partition. In this manner, any problems with the migration are identified before the actual migration, thus avoiding problems associated with an unsuccessful migration. In one embodiment, migration validation first creates a test copy of the virtual machine being migrated (LPAR 320) onto the same system (system 310). A new test LPAR 321 is created with a configuration that matches LPAR 320. A consistent snapshot (OS 325) is captured of the original OS 324 using a copy on write snapshot technique. The new test LPAR 321 is tested to ensure the operating system can execute in the LPAR. In one embodiment, testing involves a test boot of snapshot OS 325 in test LPAR 321. If the test is successful, then a second test is performed of a migration onto the other system (system 312). LPAR 322 is created on target system 312. In one embodiment, LPAR 322 is created matching the instance of LPAR 321 that was created on source system 310. A trial migration is performed of snapshot OS 325 running in LPAR 321 on system 310 to target LPAR 322 on system 312. If the trial migration is successful, then the live instance of the virtual machine is migrated from LPAR 320 on source system 310 to LPAR 322 on target system 312.

LPARs are assigned a subset of a computer's physical hardware resources (i.e., a subset of the hardware underlying the server environment) and are virtualized within the server environment as a separate computer/virtual machine. Resources such as processor capacity, memory, or any other type of resource may be assigned to a particular LPAR. Each LPAR has its own virtual operating system (OS) instance (e.g., operating systems 324, 325, and 326 corresponding to LPARs 320, 321, and 322, respectively), application programs (e.g., application(s) 328 329, and 330 corresponding to LPARs 320, 321, and 322, respectively) and/or associated files, allowing for multiple operating systems to be simultaneously executing within the server environment. Being that LPARs 321 and 322 are some forms of copies of LPAR 320, in this example, the operating systems and files of the various LPARs would be essentially the same.

A LPAR 340 (in server system 310) and a LPAR 342 (in server system 312) is dedicated to implementing I/O functionality by executing virtual I/O server (VIOS) software/firmware (software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system)). The LPAR 340/342 running the VIOS software/firmware may be referred to herein as a VIOS LPAR or VIOS partition 340/342. Likewise, the executing VIOS software/firmware, which provides VIOS functionality, may be referred to herein as a VIOS. Logical partitioning is facilitated by software 346 and 348 in respective server systems 310 and 312 (a "hypervisor") that controls the computer system's hardware and monitors the operating systems of the LPARs. Hypervisor 346/348 operates at a level between the logical partition operating systems level and server system physical hardware. Hypervisor 346/348 may run directly on the computer system's hardware or within a conventional operating system environment, depending upon the implementation.

It should be understood that a single LPAR or multiple LPARs may be migrated between different hardware platforms. Further, multiple LPARs may be migrated serially or concurrently. The transfer or migration of LPARs from server system 310 to server system 312 is coordinated by a hardware management console (HMC) 350. HMC 350, or portions thereof, may be implemented in any suitable manner using known techniques that may be hardware-based, software-based, or some combination of both. For example, HMC 350 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). The transfer of partitions may be performed over an Ethernet 352 (e.g., using iSCSI protocols, etc.) or a private Ethernet 354 through respective service processors 360 and 362. Server systems 310 and 312 may also be configured with access through respective VIOS partitions 340 and 342 to an external storage subsystem 366 via a storage area network (SAN) 368. Although the description provided herein may be directed toward the migration of an LPAR from server system 310 to server system 312, each of server systems 310 and 312 may be similarly configured to enable the functions described herein.

Live LPAR mobility enables a running LPAR(s) with its OS and applications to be transferred from one physical hardware platform to a different hardware platform. In one embodiment, VIOS partitions 340 and 342 are configured with code and/or routines to provide the function of transporting the partition sate from one hardware platform to another hardware platform. A VIOS partition with mobility capability enabled may sometimes be referred to as a mover service partition (MSP). At least one virtual asynchronous services interface (VASI) device of the MSP enables the MSP to communicate with its respective hypervisor. Hypervisors 346/348 maintain information corresponding to a state of a partition, including the partition's memory. During migration, hypervisors 346 and 348 provide support to transfer partition information (e.g., state information and a memory image) between MSP partitions. Source and destination mover service partitions communicate with each other over the network. On both the source and destination server systems, the VASI device provides communication between the MSP and the hypervisor. To move a partition's memory image, the hypervisor sends and tracks the partition's memory pages relying on the source and destination MSPs to provide central processing unit (CPU) and memory resources. If the migrating partition writes to a memory page after its information has been sent to the destination MSP, the hypervisor manages re-sending the memory pages with the updated write content to enable the partition to continue to run during the mobility operation. Thus, data flows from the source hypervisor on the source server system through the source MSP to the destination MSP and down to the hypervisor on the source server system.

In some instances, a partition's memory page may be quite large (e.g., if running databases, etc.). Further, the amount of VIOS CPU cycles utilized by a hypervisor increases if the MSP needs to support mobility of large partitions or a relatively large number of concurrent partition mobility operations. Accordingly, the length of time and rate of data transfer for the mobility operations are bound by the amount of memory and CPU cycles provided to the hypervisors by the MSP. Because of the length of time that may be required to fully migrate a partition, such as LPAR 320, from one system to another, such as from system 310 to system 312, mobility validation module 355 is utilized to test such a migration before actually migrating the live LPAR from the source system to the target system.

Embodiments of the present disclosure enable the selection and/or configuration of resources to be used for partition mobility operations to accommodate and/or balance performance and concurrency. As indicated above, the length of time and rate of data transfer for the mobility operations is dependent on the amount of memory a hypervisor has access to for migrating a partition's memory and the number of CPU threads used for managing the memory buffers. The amount of memory depends on both the size and number of memory buffers allocated per mobility operation. Further, the amount of CPU used per mobility operation depends on the number of threads used and the length of time the threads run. Embodiments of the present disclosure enable the flexible selection of memory resources and CPU thread configuration (e.g., number and running time) in a way to fit concurrency versus performance needs for the partition mobility operations. For example, for partitions with relatively light memory usage, a larger number of concurrent operations may be performed at a reduced rate or a smaller quantity of concurrent operations at a higher rate of speed.

Figure 4:
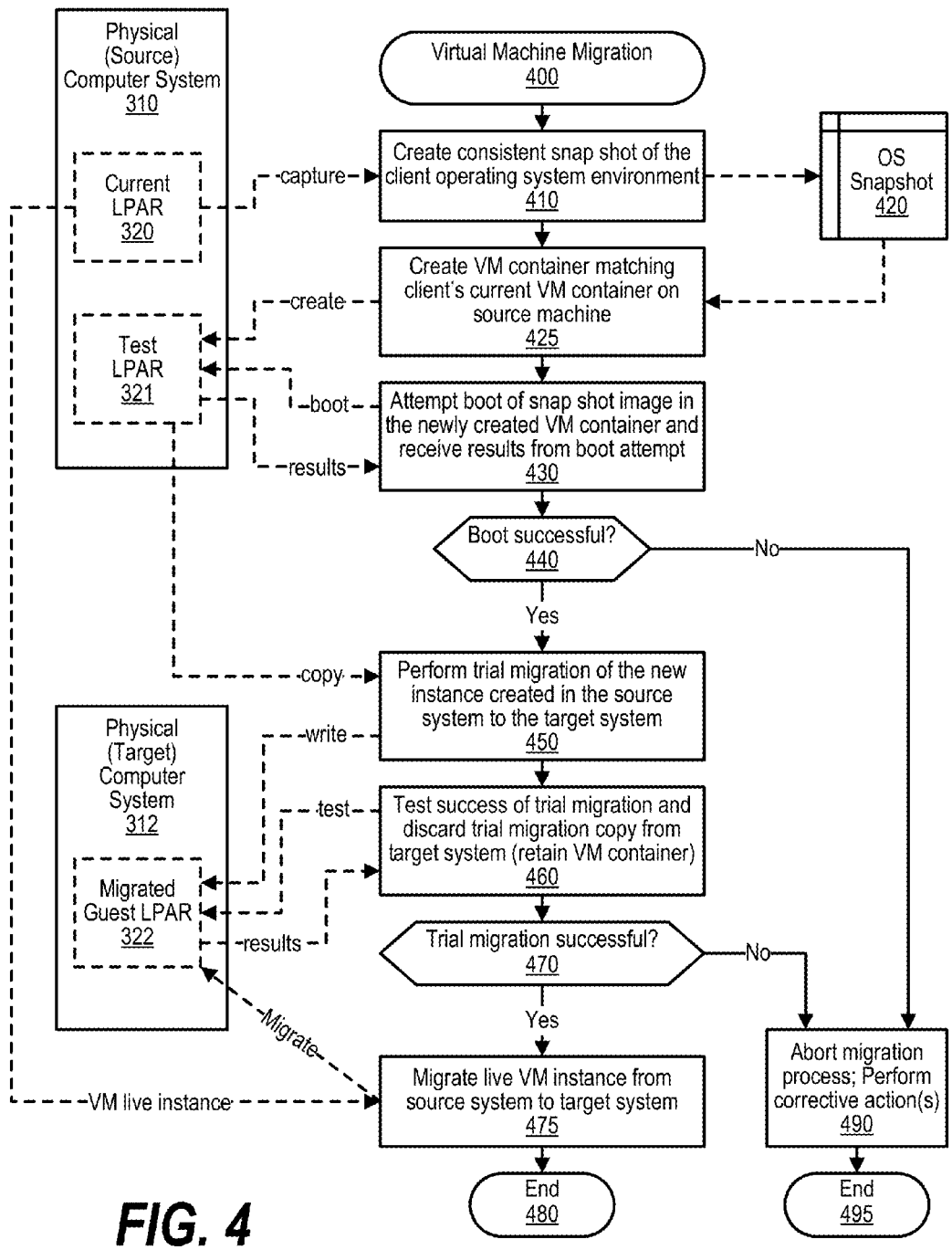
FIG. 4 is a flowchart depicting steps taken in mobility validation by trial boot using a snap shot.

In the embodiment illustrated in FIG. 3, HMC 350 includes a mobility validation module 355, an allocation module 370, an interface 372 and mobility configuration data 374. As previously mentioned, mobility validation module 355 is used to perform a test of migrating a partition, such as LPAR 320, from one system to another, such as from source system 310 to target system 312. Further details of the steps performed by mobility validation module 355 are shown in FIG. 4 and described with reference to FIG. 4 further below.

Allocation module 370 is used to select and/or set a desired allocation of resources for partition mobility operations. The allocation settings may be applied to a particular mobility operation or a set of mobility operations. For example, the allocation setting may be selected to apply to each partition for a mobility operation covering multiple partitions. The allocation setting may also be selected to apply and/or vary for certain partitions (even though the mobility operation may cover multiple partitions). For example, in some embodiments, a mobility operation may be directed toward five different partitions (LPAR.sub.1-LPAR.sub.5). A particular allocation setting may be set/applied to LPAR.sub.1, LPAR.sub.2 and LPAR.sub.4, while a different allocation setting may be set/applied to LPAR.sub.3 and LPAR.sub.5. The mobility operation may be initiated and the different allocation settings automatically applied on a partition-by-partition basis (e.g., applying one setting for one set of LPARs and a different setting to a different set of LPARs). Allocation module 370 may be implemented in any suitable manner using known techniques that may be hardware-based, software-based, or some combination of both. For example, allocation module 370 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Mobility configuration data 374 may comprise information associated with the allocation of memory and/or CPU resources to apply to partition mobility operations. For example, in the illustrated embodiment, mobility configuration data 374 includes one or more mobility settings 380 comprising memory configuration data 382 and thread configuration data 384. A particular value and/or setting for memory configuration data 382 and thread configuration data 384 may correspond to a particular respective memory buffer and CPU thread configuration setting for a mobility operation. Memory configuration data 382 may correspond to a quantity and/or size of memory resources. Thread configuration data 384 may correspond to a quantity of CPU threads, a running time of threads and/or thread prioritization. It should be understood that other types of resources and/or resource attributes may be correspondingly set/allocated for the mobility operations to accommodate performance and/or concurrency requirements.

Interface 372 is used to provide a graphical user interface (GUI) or other type of interface to enable a user/administrator to select the resource allocation configuration settings to apply to the partition mobility operation. Interface 372 may be implemented in any suitable manner using known techniques that may be hardware-based, software-based, or some combination of both. For example, interface 372 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In some embodiments, interface 372 may be configured to identify default values applied for memory configuration data 382 and thread configuration data 384 based on a particular setting 380 selected by a user/administrator. For example, in some embodiments, interface 372 may comprise a slider bar or other type of GUI such that a particular value/setting on the slider bar/GUI corresponds to particular memory configuration data 382 and/or thread configuration data 384 settings. In this embodiment, a lower slider bar/GUI value or setting may correspond to higher performance such that a greater quantity and/or larger size memory resources are allocated and/or provided to hypervisors. Also, additional threads may be used for managing the migration of memory information. With this setting, a large, active partition may be migrated faster because the hypervisor has access to more memory and thread resources for the mobility operation. Correspondingly, a higher slider bar/GUI value or setting may correspond to greater/maximum concurrency such that smaller sized memory resources are allocated to the hypervisor and perhaps one thread is used to manage memory resources. With this setting, many, less active partitions may be migrated concurrently because the hypervisor has access to less memory resources so more operations can be handled without impacting other VIOS operations. In some embodiments, interface 372 may be configured to enable a user/administrator to select particular memory and/or thread allocation settings for mobility operations, thereby enabling a customized resource allocation for mobility operations. Thus, in response to the selection of particular setting 380, allocation module 370 allocates corresponding memory and CPU resources utilized for the mobility operations. Further, in some embodiments, allocation module 370 may be used to prioritize the migration of LPARs. For example, in some embodiments, a user/administrator may desire that certain migration operations be prioritized for certain LPARs. Allocation module is configured to perform the mobility operations according to the set prioritization.

FIG. 4 is a flowchart depicting steps taken in mobility validation by trial boot using a snap shot. FIG. 4 processing commences at 400 and shows the steps taken by a process that implements virtual machine migration by performing a trial boot of the virtual machine using a snap shot. At step 410, the process creates a consistent snap shot of the client operating system environment. Step 410 captures a snapshot 420 of the OS image from current LPAR 320 and stores the captured data in a storage subsystem. At step 425, the process creates a virtual machine container, shown as test LPAR 321, that matches the client's current virtual machine container 320 on source machine 310. Test LPAR 321 is populated with the OS snap shot 420.

At step 430, the process attempts to boot the snap shot image of the newly created virtual machine container (Test LPAR 321) and receive results from the boot attempt. The process determines whether the boot of Test LPAR 321, populated with OS snapshot 420 from current LPAR 320, was successful (decision 440). If the boot was successful, then decision 440 branches to the 'yes' branch for further processing. On the other hand, if the boot was unsuccessful, then decision 440 branches to the 'no' branch to perform error processing at step 490.

If the boot of test LPAR 321 was successful then, at step 450, the process performs a trial migration of the new instance (test LPAR 321) created in source system 310 to target system 312. This results in another test LPAR (Migrated Guest LPAR 322), however this test LPAR is stored on target computer system 312 instead of on source computer system 310. At step 460, the process tests the success of the trial migration and, after the test, discards the trial migration copy (OS snapshot 420) from target system. The virtual machine container is, however, retained on target system 312. In one embodiment the test is performed by attempting to boot the trial migration copy of LPAR 322 on target system 312. The process then determines whether the trial migration was successful (decision 470). If the trial migration was successful, then decision 470 branches to the 'yes' branch to perform the actual migration at step 475. On the other hand, if the trial migration was unsuccessful, then decision 470 branches to the 'no' branch to perform error processing at step 490.

In response to a successful trial migration, at step 475, the process migrates the live virtual machine instance (LPAR 320) from source system 310 to target system 312 resulting in a live migrated virtual machine instance of the client's virtual machine environment in LPAR 322. After successful migration of the virtual machine instance, FIG. 4 processing ends at 480.

Returning to decisions 440 and 470, if an error occurred during either the attempted boot on the source system with decision 440 branching to the 'no' branch, or an error occurred during the test of the trial migration with decision 470 branching to the 'no' branch then, at step 490, the process aborts the migration process. The process performs corrective actions such as informing system operators of the migration failure so that such operators can investigate the problem and make corrections to the system so that the current virtual machine environment can be migrated from source system 310 to target system 312. After aborting the migration process at step 490, FIG. 4 processing ends at 495.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of migrating a live instance of a virtual machine from a source computer system to a target computer system, wherein the live instance of the virtual machine is managed by a hypervisor, the method comprising:
   creating a consistent snap shot image of an operating system environment that is running the live instance of the virtual machine on the source computer system;
   creating a test virtual machine container based on an actual virtual machine container corresponding to the live instance of the virtual machine;
   generating, based on the snap shot image of the operating system environment, a test virtual machine in the test virtual machine container;
   testing the generated test virtual machine, wherein a migration of the live instance of the virtual machine is performed in response to a successful test of the test virtual machine; and
   inhibiting commencement of the migration in response to an unsuccessful test of the test virtual machine.

2. The method of claim 1 wherein the test virtual machine is created on the source computer system and wherein the testing further comprises:
   attempting to boot an image of the operating system loaded in the test virtual machine, wherein a successful test is based on a successful boot, and wherein an unsuccessful test is based on an unsuccessful boot.

3. The method of claim 2 further comprising:
   performing a trial migration to the target computer system by copying the created test virtual machine container that includes the copied snap shot image from the source computer system to a new virtual machine on the target computer system;
   testing the trial migration on the target computer system, wherein the migration of the live instance of the virtual machine is performed in response to a successful test of the trial migration on the target computer system; and
   aborting the migration in response to an unsuccessful test of the trial migration on the target computer system.

4. The method of claim 3 wherein performing the trial migration further comprises:

attempting a second boot of the operating system image copied to the new virtual machine on the target computer system, wherein the trial migration is successful in response to a successful second boot of the operating system image on the target computer system.

5. The method of claim 1 wherein the test virtual machine is created on the target computer system, and wherein the method further comprises:
attempting to boot an image of the operating system loaded in the test virtual machine, wherein a successful test is based on a successful boot, and wherein an unsuccessful test is based on an unsuccessful boot.

6. The method of claim 1 wherein, in response to the successful test, the method further comprises:
performing a trial migration to the target computer system by copying the generated test virtual machine container is based on the snap shot image to a new virtual machine on the target computer system;
testing the trial migration on the target computer system, wherein the migration of the live instance of the virtual machine is performed in response to a successful test of the trial migration on the target computer system; and
aborting the migration in response to an unsuccessful test of the trial migration on the target computer system.

7. The method of claim 6 further comprising:
discarding a trial migration copy from the new virtual machine on the target computer system, wherein the discarding retains a virtual machine container corresponding to the new virtual machine on the target computer system; and
migrating the live instance of the virtual machine from the source computer system to the new virtual machine on the target computer system after the discarding of the trial migration copy.

8. An information handling system comprising:
one or more processors;
one or more data stores accessible by at least one of the processors;
a memory coupled to at least one of the processors; and
a set of computer program instructions stored in the memory and executed by at least one of the processors in order to migrating a live instance of a virtual machine, managed by a hypervisor, from a source computer system to a target computer system, by performing actions comprising:
creating a consistent snap shot image of an operating system environment that is running the live instance of the virtual machine on the source computer system;
creating a test virtual machine container based on an actual virtual machine container corresponding to the live instance of the virtual machine;
generating, based on the snap shot image of the operating system environment, a test virtual machine in the test virtual machine container;
testing the generated test virtual machine, wherein a migration of the live instance of the virtual machine is performed in response to a successful test of the test virtual machine; and
inhibiting commencement of the migration in response to an unsuccessful test of the test virtual machine.

9. The information handling system of claim 8 wherein the test virtual machine is created on the source computer system and wherein the testing further comprises:
attempting to boot an image of the operating system loaded in the test virtual machine, wherein a successful test is based on a successful boot, and wherein an unsuccessful test is based on an unsuccessful boot.

10. The information handling system of claim 9 wherein the actions further comprise:
performing a trial migration to the target computer system by copying the created test virtual machine container that includes the copied snap shot image from the source computer system to a new virtual machine on the target computer system;
testing the trial migration on the target computer system, wherein the migration of the live instance of the virtual machine is performed in response to a successful test of the trial migration on the target computer system; and
aborting the migration in response to an unsuccessful test of the trial migration on the target computer system.

11. The information handling system of claim 10 wherein performing the trial migration further comprises:
attempting a second boot of the operating system image copied to the new virtual machine on the target computer system, wherein the trial migration is successful in response to a successful second boot of the operating system image on the target computer system.

12. The information handling system of claim 8 wherein the test virtual machine is created on the target computer system, and wherein the actions further comprise:
attempting to boot an image of the operating system loaded in the test virtual machine, wherein a successful test is based on a successful boot, and wherein an unsuccessful test is based on an unsuccessful boot.

13. The information handling system of claim 8 wherein, in response to the successful test, the actions further comprise:
performing a trial migration to the target computer system by copying the generated test virtual machine container is based on the snap shot image to a new virtual machine on the target computer system;
testing the trial migration on the target computer system, wherein the migration of the live instance of the virtual machine is performed in response to a successful test of the trial migration on the target computer system; and
aborting the migration in response to an unsuccessful test of the trial migration on the target computer system.

14. The information handling system of claim 13 wherein the actions further comprise:
discarding a trial migration copy from the new virtual machine on the target computer system, wherein the discarding retains a virtual machine container corresponding to the new virtual machine on the target computer system; and
migrating the live instance of the virtual machine from the source computer system to the new virtual machine on the target computer system after the discarding of the trial migration copy.

15. A computer program product stored in a computer readable storage medium, comprising computer program code that, when executed by an information handling system migrates a live instance of a virtual machine from a source computer system to a target computer system, wherein the live instance of the virtual machine is managed by a hypervisor, and wherein the migration occurs by performing actions comprising:
creating a consistent snap shot image of an operating system environment that is running the live instance of the virtual machine on the source computer system;
creating a test virtual machine container based on an actual virtual machine container corresponding to the live instance of the virtual machine;

generating, based on the snap shot image of the operating system environment, a test virtual machine in the test virtual machine container;

testing the generated test virtual machine, wherein a migration of the live instance of the virtual machine is performed in response to a successful test of the test virtual machine; and inhibiting commencement of the migration in response to an unsuccessful test of the test virtual machine.

16. The computer program product of claim 15 wherein the test virtual machine is created on the source computer system and wherein the testing further comprises:

attempting to boot an image of the operating system loaded in the test virtual machine, wherein a successful test is based on a successful boot, and wherein an unsuccessful test is based on an unsuccessful boot.

17. The computer program product of claim 16 wherein the actions further comprise:

performing a trial migration to the target computer system by copying the created test virtual machine container that includes the copied snap shot image from the source computer system to a new virtual machine on the target computer system;

testing the trial migration on the target computer system, wherein the migration of the live instance of the virtual machine is performed in response to a successful test of the trial migration on the target computer system; and aborting the migration in response to an unsuccessful test of the trial migration on the target computer system.

18. The computer program product of claim 17 wherein performing the trial migration further comprises:

attempting a second boot of the operating system image copied to the new virtual machine on the target computer system, wherein the trial migration is successful in response to a successful second boot of the operating system image on the target computer system.

19. The computer program product of claim 15 wherein the test virtual machine is created on the target computer system, and wherein the actions further comprise:

attempting to boot an image of the operating system loaded in the test virtual machine, wherein a successful test is based on a successful boot, and wherein an unsuccessful test is based on an unsuccessful boot.

20. The computer program product of claim 15 wherein, in response to the successful test, the actions further comprise:

performing a trial migration to the target computer system by copying the generated test virtual machine container is based on the snap shot image to a new virtual machine on the target computer system;

testing the trial migration on the target computer system, wherein the migration of the live instance of the virtual machine is performed in response to a successful test of the trial migration on the target computer system;

aborting the migration in response to an unsuccessful test of the trial migration on the target computer system;

discarding a trial migration copy from the new virtual machine on the target computer system, wherein the discarding retains a virtual machine container corresponding to the new virtual machine on the target computer system; and migrating the live instance of the virtual machine from the source computer system to the new virtual machine on the target computer system after the discarding of the trial migration copy.

* * * * *